United States Patent [19]

Ondrasik

[11] Patent Number: 4,762,085
[45] Date of Patent: Aug. 9, 1988

[54] COLLAPSIBLE WIRE CAGE

[76] Inventor: Vladimir J. Ondrasik, 11215 S. Wilmington, Los Angeles, Calif. 90059

[21] Appl. No.: 934,465

[22] Filed: Nov. 24, 1986

[51] Int. Cl.$^4$ ............................................. A01K 31/00
[52] U.S. Cl. ....................................................... 119/17
[58] Field of Search ............................ 119/17, 19, 22; 220/331, 332, 329, 19, 1.5, 4 F, 6, 7; 49/382, 193; 43/105

[56] References Cited

U.S. PATENT DOCUMENTS

| | | | |
|---|---|---|---|
| 1,129,011 | 2/1915 | Pyle | 220/6 X |
| 1,669,300 | 5/1928 | Hunter | 220/6 |
| 2,892,562 | 6/1959 | Smithson | 119/17 X |
| 3,058,445 | 10/1962 | Johnson | 119/17 |
| 3,556,058 | 1/1971 | Smiler | 220/19 X |
| 4,577,772 | 3/1986 | Bigliardi | 220/4 F X |

OTHER PUBLICATIONS

Central Metal Products, Inc., Catalog, undated–see "Uni-Fold Cages".
Midwest Metal Products, Catalog, undated (1985)–see "Folding Cages", Models 60–62.
Kennel-Aire Spring 1985 Catalog–see "Commander".

Primary Examiner—Robert P. Swiatek
Assistant Examiner—R. Thomas Price
Attorney, Agent, or Firm—Brown, Martin, Haller & Meador

[57] ABSTRACT

A collapsible wire cage has opposite side walls, upper and lower walls, and end walls of wire grille construction defining an enclosure. Each end wall is pivoted at one side edge to a respective one of the side walls and has a releasable locking mechanism at its other side edge for releasably securing it to the other side wall. The upper and lower walls are each formed in two panel sections, one of which is pivoted to one of the side walls and the other of which is pivoted to the other side wall. The panel sections are pivotally connected together to allow them to pivot between an expanded position in which they are coplanar and a folded position in which they are pivoted inwardly and flattened against one another to collapse the cage. A releasable locking mechanism is provided on each of the collapsible walls to retain them in their expanded, coplanar position. In an alternative, the side walls may be collapsible with the end walls pivotally secured to the upper and lower walls.

12 Claims, 3 Drawing Sheets

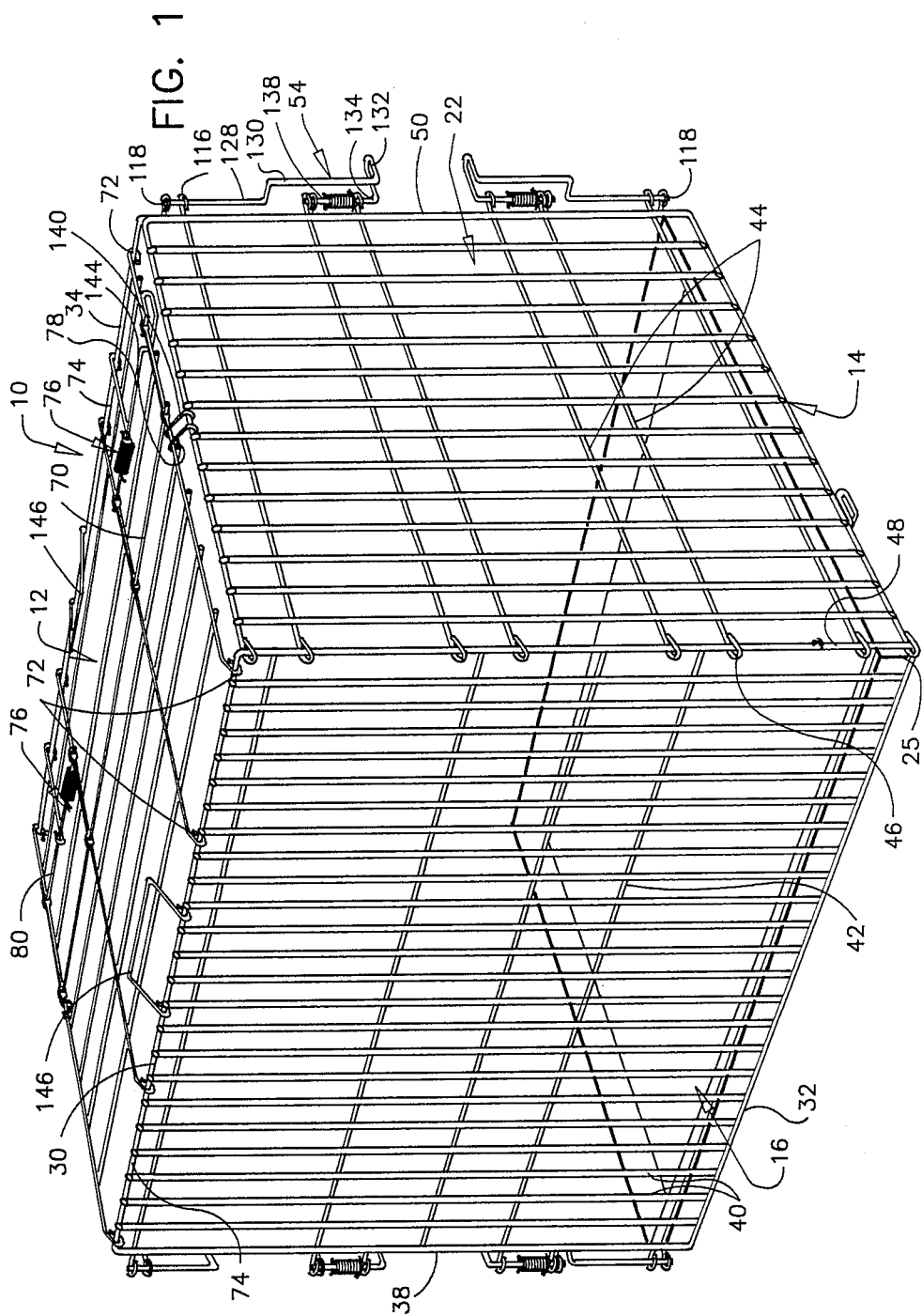

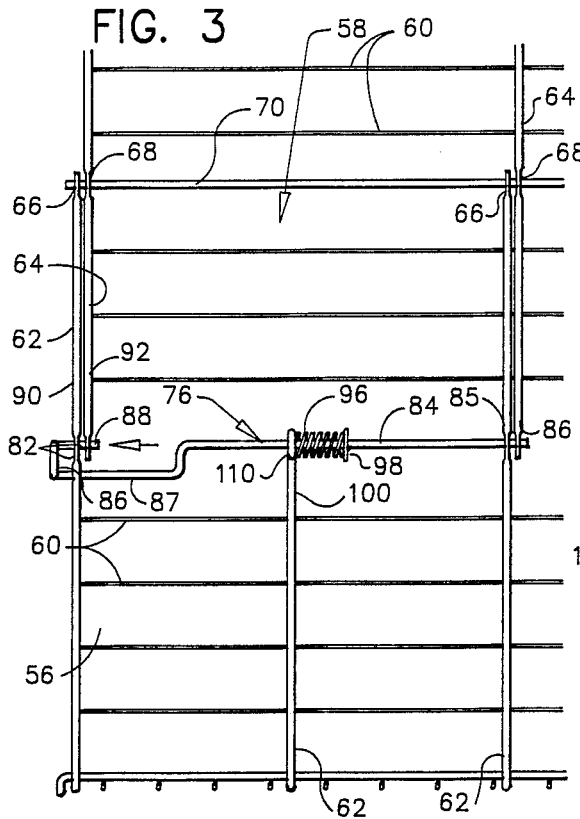
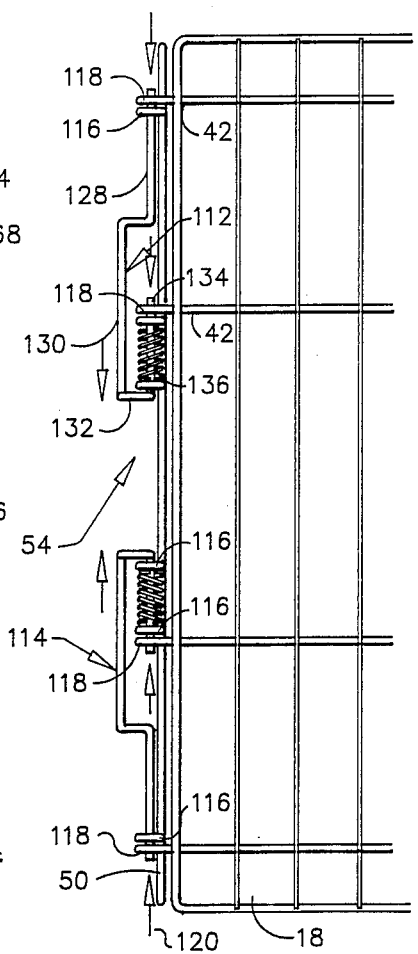
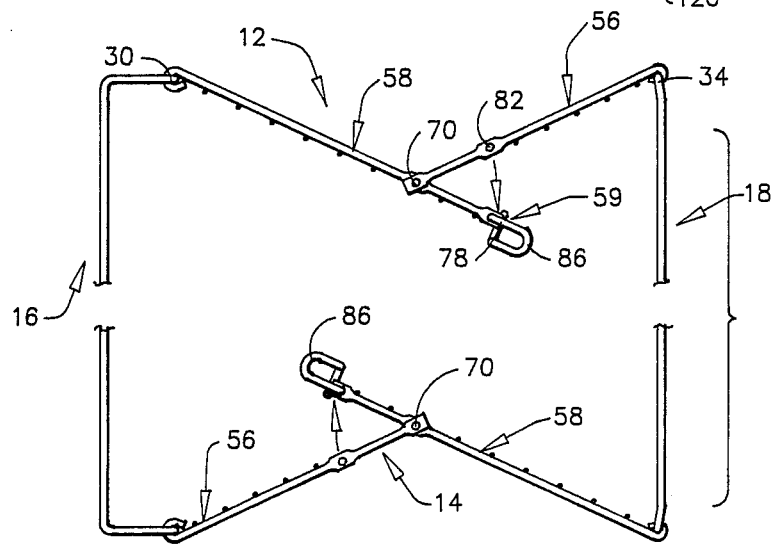

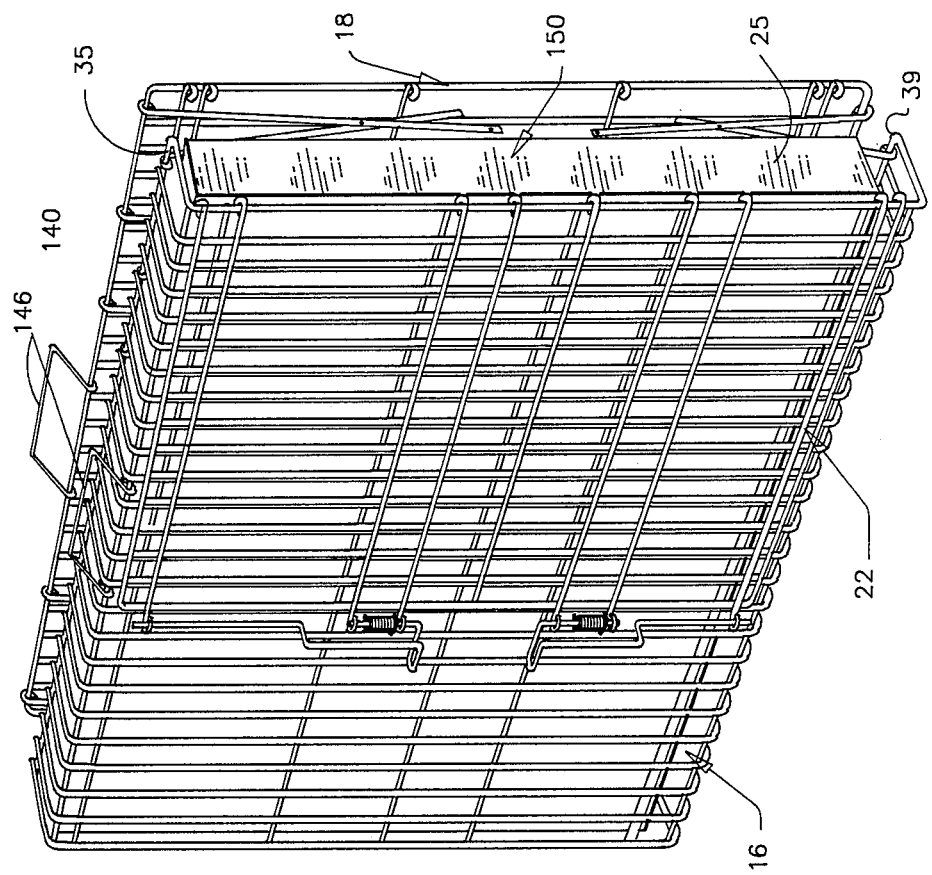

COLLAPSIBLE WIRE CAGE

BACKGROUND OF THE INVENTION

The present invention relates to a collapsible wire cage of the type generally used for animal enclosures.

Wire animal cages are often used for confining animals, either in a particular location such as a kennel, animal show or the like, or during transportation of animals from one location to another. It is desirable that such cages be collapsible for easy storage and handling when not in use, and a number of prior art animal cages have been of collapsible construction.

In U.S. Pat. No. 3,556,058 of Smiler, for example, a collapsible cage is formed from six wire grille panels having detachable hinges which allow the cage to be separated into two pieces of three hinged sections each, which can be folded flat for storage. This has the disadvantage that two separate sections must be stored, with consequent difficulty in reassembling and risk of loosing one section. It is more difficult to carry two separate parts from a place of storage to a place where they are to be used, and the parts are separated by completely removing two hinge rods which also must be stored and may easily be lost.

In U.S. Pat. No. 1,129,011 of Pyle a folding shipping crate is described which has top and bottom walls hinged to the respective side walls so that the top and one side wall can be folded flat against the bottom and other side wall. A similar collapsing arrangement is shown in U.S. Pat. No. 2,892,562 of Smithson. This has the disadvantage that a large rectangular area is required for storage, since the collapsed cage will have a length equal to the sum of the height of the side walls and the width of the top or bottom walls.

SUMMARY OF THE INVENTION

It is an object of the present invention to provide an animal cage which is readily collapsible for storage and can be easily carried and reassembled for use when needed.

According to the present invention a collapsible wire animal cage is provided which comprises two pairs of opposed walls defining an open-ended enclosure, the walls of one pair being collapsible and each being pivotally connected at their opposite side edges to adjacent side edges of the two walls of the other pair. The collapsible walls each comprise two sections pivoted together along a pivot axis extending between the opposite ends of the enclosure to allow them to pivot between an open position in which they are substantially flat and co-planar and a collapsed position in which they are folded inwardly relative to the enclosure into a face to face engagement with one another, drawing the other pair of walls inwardly towards one another into a collapsed, storage position. Each collapsible wall has a releasable securing or locking mechanism for releasably securing it in its open position while the cage is in use.

A pair of opposite end walls are provided for closing the opposite ends of the enclosure. Each end wall is pivotally secured at one edge to one of the non-collapsible walls at the respective end of the enclosure, and releasably secured at the opposite edge to the other non-collapsible wall. Thus for storage the end wall is released at one edge and pivoted about the other edge into face to face engagement with the wall to which it is pivotally secured. In the preferred embodiment one of the end walls is pivoted to one of the non-collapsible walls and the other end wall is pivoted to the other non-collapsible wall, so that the end walls are pivoted outwardly in opposite directions for storage.

Preferably, the two pivot sections overlap at their inner edges and are pivoted together by means of a pivot rod which extends through a first set of aligned openings in the inner edge of a first one of the sections and the overlapped portion of the other section. The securing mechanism is arranged to releasably secure the inner edge of the other section to the overlapped edge of the first section in the open position.

In the preferred embodiment the two pivot sections of each collapsible wall each comprise a wire panel having a series of spaced rods extending between opposite ends of the enclosure and a series of cross bars extending transverse to the rods. The pivot rod is generally centrally located and extends through a first set of aligned openings in the overlapping portions of the cross bars. Preferably, the securing mechanism for holding the two sections in their open, flat position comprises a pair of spring loaded clip rods, one at each end of the wall, which extend through a second set of aligned openings in the overlapping portions of the cross bars which are offset from the pivot rod.

One of the non-collapsible walls, which are the side walls of the cage in the preferred embodiment but which could be the top and bottom walls in alternative arrangements, has its opposite edges to which the opposite collapsible walls are pivoted bent inwardly so that the pivotal connection to the collapsible walls is offset from the plane of the non-collapsible walls. This means that when the cage is folded or collapsed, a gap will be left between that non-collapsible wall and the folded collapsible walls. This gap can be used for storage of an animal tray or pan of the type often used in the bottom of such cages for holding sawdust and the like and for catching debris.

In the preferred arrangement, carrying handles are provided on edges of the non-collapsible walls which will be adjacent one another when the cage is collapsed, to facilitate carrying the cage to and from a storage location or from one place of use to another.

BRIEF DESCRIPTION OF THE DRAWINGS

The present invention will be better understood from the following detailed description of a preferred embodiment, taken in conjunction with the accompanying drawings in which like reference numerals refer to like parts, and in which:

FIG. 1 is a perspective view showing an animal cage according to a preferred embodiment of the present invention in its fully expanded, ready-for-use condition;

FIG. 2 is a partial view showing details of the door release mechanism;

FIG. 3 is a partial view showing details of one of the collapsible wall release pins;

FIG. 4 is an end view of the cage showing a modification to one of the side walls and showing the end door opened and clipped back and the upper and lower walls partially collapsed; and FIG. 5 is a perspective view of the modified cage in its collapsed, storage condition.

DESCRIPTION OF THE PREFERRED EMBODIMENT

FIG. 1 of the drawings shows a collapsible, wire grille cage 10 according to a preferred embodiment of the present invention in its fully assembled and ready-to-use condition. The cage basically comprises two pairs of opposed walls 12, 14 and 16, 18 connected together to form upper, lower and opposite side walls of an open-ended enclosure. The opposite ends of the enclosure are closed by releasable end doors or walls 22, 24. In FIG. 1, the side wall 18 and end wall 24 have been omitted for reasons of clarity. In the preferred embodiment a tray or pan 25 is placed in the bottom of the cage when assembled, to catch food or debris and to contain bedding materials, for example. Trays or pans of this type are commonly used in animal cages.

Each wall of one of the opposed pairs is collapsible to allow the cage to be flattened for storage as shown in FIG. 5 and described in more detail below. In the preferred embodiment of the invention shown in the drawings the upper and lower walls 12 and 14 are each collapsible and pivotally secured at their opposite side edges to the upper and lower edges, 30, 32 and 34, 36, respectively, of the opposite side walls 16 and 18. However, in an alternative embodiment the opposite side walls could be of collapsible construction and be pivotally secured to the opposite side edges of the upper and lower walls. In a modification best shown in FIGS. 4 and 5, one of the side walls is bent inwardly out of the plane of the side wall at its upper and lower edges 30 and 32, so that the upper and lower walls pivot around lines 35, 39 which are offset inwardly from the plane of side wall 16.

As shown in the drawings each of the walls of the cage is preferably of wire grille, wire rod or mesh panel construction, each of the non-collapsible side walls consisting of a bent rod or wire 38 defining the outer perimeter of the panel which is of substantially rectangular shape, and a series of spaced transverse wires 40 extending between the upper and lower edges of the panel. A series of cross wires or rods 42 extend between opposite ends of the panel for strengthening.

Each of the end walls is of similar construction, and in the preferred embodiment one of the end walls 22 is pivotally secured at one side edge to one of the side walls 16 while the other end wall is pivotally secured at its opposite side edge to the other side wall 18. The pivotal or hinge connection between the end walls and the opposite side walls is provided by extensions of the end wall cross bars 44 which are bent to form eyelets or hinges 46 around the adjacent vertical end portion 48 of the bent rod 38 of the respective side wall 16, 18, as best shown in FIG. 1. Although in the preferred arrangement the end walls are pivotally secured to the opposite side walls, in an alternative they may each be pivoted to the same side wall at opposite ends of the enclosure. In another alternative arrangement where the side walls are collapsible, as discussed above, the end walls will be pivotally secured to the respective upper and lower walls in an equivalent manner.

The end walls are releasably connected at their free side edges 50, 52, respectively to the opposite ends of the side walls 18, 16, respectively, by means of a releasable fastener mechanism 54 which is described in more detail below in connection with FIG. 2. This allows either of the end doors or walls to be opened to allow animals to enter or exit the cage, and allows both doors to be opened when the cage is to be collapsed for storage as described in more detail below.

The collapsible upper and lower walls will now be described in more detail with reference to FIGS. 1, 3 and 4. Each of the walls is formed in two panel sections 56, 58, which overlap one another as can be seen in FIGS. 1 and 4. Each panel section consists of a plurality of spaced longitudinal wires or rods 60 extending the length of the cage, and a series of spaced transverse or cross bars 62, 64, respectively, extending across and secured to the longitudinal wires. The cross bars 62 of one of the panel sections 56 extend beyond the innermost longitudinal rod 60 of that section to overlap the other panel section 58, and the cross bars 62 and 64 have a first set of aligned openings 66, 68 through which a pivot rod 70 extends to allow the sections 56 and 58 to pivot around rod 70 and the opposite edge hinge connections to the side walls to collapse or flatten the cage. Thus panel section 56 is pivotally connected at its inner edge to an intermediate point on panel section 58, which is offset from the inner end 59 of that section.

The hinge connections to the adjacent side wall longitudinal edges are similar to those of the end walls and consist of projections of the respective panel sections from the outermost longitudinal rods which are bent round to form eyelets or hinges 72 around the respective longitudinal edge portion 74 of the side wall perimeter rod 38. The pivotal connections between each of the panel sections and between the respective panel section and adjacent side wall allow the panel sections to pivot between an open position in which they are substantially flat and co-planar, as shown in FIG. 1, and a collapsed position in which they are folded inwardly relative to the enclosure, as indicated in FIG. 4, into face to face engagement with one another in the fully collapsed position shown in FIG. 5. Each of the pivot rods 70 is in a substantially central position on the respective upper and lower walls, and the dimensions are such that the opposite upper and lower walls can collapse inwardly without interfering with one another. Preferably, the lower wall has its panel sections arranged the opposite way round to those of the upper wall, with section 58 pivoted to side wall 16 and section 56 pivoted to side wall 18.

Each of the collapsible walls has a releasable locking mechanism 76, as best shown in FIGS. 1 and 3, for releasably locking or retaining the respective wall in its open, fully extended position as shown in FIG. 1. The locking mechanism releasably secures the inner free edge of panel section 58 to overlying portions of panel section 56. The locking mechanism comprises a pair of locking spring clips 78, 80, one each provided at each end of the wall. Each of the spring clips extends through a second series of aligned openings in overlapping portions of the cross bars 62, 64 which are offset from the pivot rod 70. Spring clip 78 extends through aligned openings 82 in the outer two cross bars of each panel section at one end of the cage, and spring clip 80 extends through aligned openings in the outer two cross bars of each panel section at the opposite end of the cage.

As best seen in FIG. 3, each spring clip comprises a rod like member having a first, elongate section 84 which extends through aligned openings of the innermost of the two cross bars 85, 86 of each section, and a bent end portion 87 which is offset from the first section, bent to form a handle portion 86, and bent inwardly at its free end 88 to extend through the outermost cross bar 90, 92 of each of the panel sections. Thus urging the spring clip at each end of the wall outwardly via handle portion 86 as indicated in FIG. 3 will release it from the respective cross bars 90, 94 of the one panel section to allow the two panel sections to pivot. The clip is urged into its locked position by means of return spring 96 which acts between a stop 98 on the elongate portion 82 and a foreshortened cross member 100 of panel section 56 which is hinged at one end to the adjacent side wall and bent around the clip or rod member to form eyelet 110 at the opposite end. Thus the spring will act to urge clip inwardly relative to the respective collapsible wall and retain the wall in its locked, open position unless positively released by outward force applied to handle portion 86. Each clip is permanently retained on panel section 56 so that it will not be lost or mislaid when the sections are released from one another.

The end wall securing mechanism 54 is similar to that of the upper and lower walls and is shown in more detail in FIG. 2. The securing mechanism consists of two opposed spring loaded latch pins 112, 114 which each extend through aligned openings provided in the respective side edge 50 of the end wall 22, 24 and the adjacent end portion of the side wall 18, 16, respectively. The openings comprise eyelets or openings 116 formed in bent projecting end portions of the end wall cross members or bars 44, and similar eyelets 118 formed in projecting end portions of the side wall cross bars or members 42. The respective eyelets 116 and 118 are arranged to be in alignment along line 120 when the door or wall is fully closed.

The cross bars of each end wall consist of two relatively closely spaced pairs of cross bars positioned in a middle portion of the wall, and upper and lower cross bars positioned adjacent the upper and lower edges, respectively, of the end wall. Each of the latch pins consists of a first straight end portion 128 which extends through the openings in the upper or lower cross bar of the end wall and the adjacent aligned uppermost or lowermost opening in the side wall, respectively, a second portion 130 which is offset inwardly relative to the first portion to avoid the other eyelets or openings, a handle or finger grip portion 132 bent outwardly from portion 130 which is located inwardly of the innermost end wall eyelet and a third portion 134 which extends back along line 120 towards the first portion and through the aligned eyelets 116 of one of the inner pairs of end wall cross bars and an inner eyelet 116 of the side wall. The handle portions 132 of the two latch pins are orientated to be parallel to one another and are located within an average hand grips distance from one another when in the secured position shown in FIG. 1 and FIG. 2.

A return spring 136 on third portion 134 of each latch pin acts between a stop 138 on the portion 134 and the innermost one of the inner pair of cross bar eyelets to urge the respective pins outwardly from the center of the door and into latching engagement with the respective side wall eyelets, i.e. in the opposite direction to the arrows in FIG. 2. This arrangement allows the end walls to be released and opened one-handed, simply by gripping the handle portions of each latch pin between the thumb and first finger of one hand and then urging them towards one another until each latch pin is released from the two side wall eyelets 116 which it normally engages. At this point, the door can be swung open about the opposite side edge hinges. A reverse operation allows the door to be reclosed, and an additional padlock may be used if desired for additional security. The return springs ensure that the door remains secured in its closed position unless positively released.

The latch pins are permanently retained on the respective end walls by the spring action, so that they cannot be lost or mislaid. In an alternative arrangement, the latch pins may be mounted on the end edges of the respective side walls in an equivalent fashion, and be retractable from eyelets in the end walls to open the cage.

A rotatable clip member 140 is provided at the upper edge of each end wall. The member is of generally U-shaped configuration with its two ends bent around the upper member of each end wall so that it is rotatably secured to that member, and is bent over at its curved end to form a latch or hook 144 which can be looped over the endmost cross bar of the upper wall as indicated in FIG. 1 to retain the end wall in position prior to latching, for example. When the end wall is released and opened prior to storage of the cage, the same clip member can be used to clip it to the respective side wall, as discussed below. The opposite side walls are preferably also provided with bent wire handle members 146 rotatably mounted at their upper edges at positions directly opposite one another, as can be seen in FIGS. 1 and 5.

The collapsible wire cage described above can be made entirely of wire rod construction using wire rod of a suitable strength guage according to the type of animal cage to be made. The cross bars of each of the wall panels are preferably of thicker construction than the transverse or longitudinal members making up the majority of the panel. The spacing between the wire rods will be chosen according to the size of the animal or animals to be kept in the cage.

The collapsing of the cage from its fully opened position shown in FIG. 1 into its fully collapsed position shown in FIG. 5 will now be described in more detail. The two end wall hooks or clip members 140 are first released from the upper wall end cross bars 44. The latch pins 112 and 114 are then released from the end portion eyelets 118 of side walls 16 and 18, respectively, by gripping the opposed handle portions and urging the latch pins towards one another. The two end walls can then be swung outwardly in opposite directions about the end portions of side walls 16 and 18, respectively, until they lie in face to face relationship against the respective side wall. At this point the clip members or hooks 140 can be hooked over the upper edge of the respective side wall to retain the end walls in place.

The tray or pan 25 is then removed from the bottom of the cage. The opposite end spring clips 78, 80 of the upper and lower walls are then released from the cross bars of the panel section 56 of each of those walls, by urging them outwardly via handle portions 86. The upper and lower walls can then be collapsed inwardly about pivot rods 70, in the direction of the arrows in FIG. 4, pivoting around the side wall hinge connections and allowing the side walls to be moved inwardly towards one another until the fully collapsed or flattened position shown in FIG. 5 is reached. At this point there will be a gap or space 150 between one side wall 16 and the collapsed upper and lower walls 12 and 14, because of the inwardly offset hinge connection at 35 and 39 between the side wall and the upper and lower wall, respectively. This gap allows tray 25 to be stored on its side as indicated in FIG. 5 for transportation and storage. When collapsed the cage and tray can easily be carried to and from a place of storage or a transport vehicle using the handle members 146.

It will be understood that the collapsed cage can be reassembled relatively quickly and easily by removing the tray 25, pulling the side walls apart until the upper and lower walls are flattened, and urging the spring clips outwardly and then releasing them to reengage in the openings in the cross bars of panel section 56. At this point the tray can be replaced in the bottom of the cage, and the end walls can be released from the side walls, swung round into their closed position, retained in the closed position by hooks 144 engaged over the upper wall end cross bars, and secured to the side walls via latch pins 112 and 114 as described above.

This collapsible animal cage has no separable parts which can easily be lost or misplaced, and can be collapsed and reassembled relatively quickly and easily. It can be carried in one hand, and allows a tray or pan to be carried within the confines of the collapsed cage as well. The end doors can be opened one handed, which is particularly useful when they are opened to put an animal in the cage, leaving the handler with one hand free to hold onto the animal while the door is being opened.

Although a preferred embodiment of the invention has been described above by way of example, it will be understood by those skilled in the field that modifications may be made to the disclosed embodiment without departing from the scope of the invention, which is defined by the appended claims.

What is claimed is:

1. A collapsible wire cage comprising:
   two pairs of opposed walls defining an open-ended enclosure, each wall of one pair being collapsible and being pivotally connected at its opposite side edges to adjacent side edges of the other pair of walls;
   a pair of end walls for closing the opposite ends of the enclosure, one of the end walls being pivoted at one edge to one of the walls of said other pair and the other end wall being pivoted at the opposite edge to the other wall of said other pair, each end wall having releasable fastener means for releasably securing it to the wall of said other pair opposite the wall to which the end wall is secured;
   the collapsible walls each comprising at least two panel sections and pivot means for pivotally connecting said panel sections about a pivot axis extending between said opposite ends of said enclosure, said pivot means comprising means for allowing pivotal movement of said sections between an open position in which they are substantially flat and co-planar and a collapsed position in which they are folded inwardly relative to said enclosure into a face to face engagement to one another to allow said other pair of walls to be moved towards one another to collapse said cage; and
   each of said collapsible walls further including releaseable securing means for releaseably securing the respective collapsible wall in said open position.

2. A collapsible wire cage comprising:
   two pairs of opposed walls defining an open-ended enclosure, each wall of one pair being collapsible and being pivotally connected at its opposite side edges to adjacent side edges of the other pair of walls;
   a pair of end walls for closing the opposite ends of the enclosure, each end wall being pivotally secured to one of the walls of said pair at the respective end of the enclosure and having releaseable fastener means for releaseably securing it to the opposite wall of said other pair;
   the collapsible walls each comprising at least two panel sections and pivot means for pivotally connecting said panel sections about a pivot axis extending between said opposite ends of said enclosure, said pivot means comprising means for allowing pivotal movement of said sections between an open position in which they are substantially flat and co-planar and a collapsed position in which they are folded inwardly relative to said enclosure into a face to face engagement to one another to allow said other pair of walls to be moved towards one another to collapse said cage; the two panel sections of the collapsible walls overlapping one another in the open position, the inner edge of a first one of the sections being pivotally secured to an overlapping portion of the second section and the inner edge of said second section being releaseably secured to an overlapping portion of the first section; and
   each of said collapsible walls further including releaseable securing means for releaseably securing the respective collapsible wall in said open position.

3. A collapsible wire cage, comprising:
   two pairs of opposed walls defining an open-ended enclosure, each wall of one pair being collapsible and being pivotally connected at its opposite side edges to adjacent side edges of the other pair of walls;
   a pair of end walls for closing the opposite ends of the enclosure, each end wall being pivotally secured to one of the walls of said other pair at the respective end of the enclosure and having releasable fastener means for releasably securing it to the opposite wall of said other pair;
   the collapsible walls each comprising at least two panel sections and pivot means for pivotally connecting said panel sections about a pivot axis extending between said opposite ends of said enclosure, said pivot means comprising means for allowing pivotal movement of said sections between an open position in which they are substantially flat and co-planar and a collapsed position in which they are folded inwardly relative to said enclosure into fact to face engagement to one another to allow said other pair of walls to be moved towards one another to collapse said cage, each of said panel sections having a plurality of spaced cross members extending across it from side to side, the cross members of one panel section over lapping the other panel section, the cross member of each panel section having a first set of aligned openings, and the pivot means comprising a pivot rod extending throughout said aligned openings between opposite ends of the respective collapsible walls; and
   each of said collapsible walls further including releasable securing means for releasably securing the respective collapsible wall in said open position.

4. The wire cage as claimed in claim 3, wherein said cross members of said panel sections have a second set of aligned openings offset from the first set, and said releasable locking means comprises at least one clip rod for extending through said second set of aligned openings to secure said panel sections against rotation.

5. The wire cage as claimed in claim 4, wherein said releasable securing means comprises a releasable clip rod at each end of each of the collapsible walls, each of the clip rods having a first end portion for projecting through a first pair of aligned openings in a cross member of one of said panel sections and a cross member of the other panel section, and a second end portion for projecting in the same direction as said first end portion through a second pair of aligned openings in cross members of said two panel sections, and handle means for urging said clip rod outwardly to release the two end portions from the openings in the cross bars of one of said panel sections.

6. The cage as claimed in claim 5, wherein spring means are provided on each of said clip rods for urging them into the retaining position in which their end portions extend through the respective aligned pairs of openings in cross members of both panel sections.

7. The cage as claimed in claim 6, wherein each clip rod has a stop in said first portion and a transverse retaining bar on said other panel section is secured to said clip rod at a point spaced from said stop, and said return spring acts between said stop and said retaining bar.

8. A collapsible wire cage, comprising:
two pairs of opposed walls defining an open-ended enclosure, each wall of one pair being collapsible and being pivotally connected at its opposite side edges to adjacent side edges of the other pair of walls;
a pair of end walls for closing the opposite ends of the enclosure, each end wall being pivotally secured to one of the walls of said other pair at the respective end of the enclosure and having releasable fastener means for releasably securing it to the opposite wall of said other pair, said releaseable fastener means of each end wall comprising a pair of oppositely directed latch pins, the adjacent respective side edge of the end wall and end edge of the respective one of the other pair of walls to which the end wall is releaseably securable having first and second sets of aligned openings, one of said latch pins comprising means for engaging in a first direction through said first set of openings and the other latch pin comprising means for engaging in a second, opposite direction through said second set of openings, each of said latch pins having gripping means at their innermost ends spaced within a hand grip's distance of one another, said gripping means comprising means for gripping by an operator to urge the latch pins towards one another to release them from the openings in one of said wall edges to release the door;
the collapsible walls each comprising at least two panel sections and pivot means for pivotally connecting said panel sections about a pivot axis extending between said opposite ends of said enclosure, said pivot means comprising means for allowing pivotal movement of said sections between an open position in which they are substantially flat and co-planar and a collapsed position in which they are folded inwardly relative to said enclosure into fact to face engagement to one another to allow said other pair of walls to be moved towards one another to collapse said cage; and
each of said collapsible walls further including releasable securing means for releasably securing the respective collapsible wall in said open position.

9. The cage as claimed in claim 8, wherein each of said latch pins includes return spring means for urging said latch pin outwardly into its latching position engaging through the aligned openings in the adjacent edges of said side and end walls.

10. The cage as claimed in claim 8, wherein each latch pin comprises a first straight end portion and an opposite end portion bent through 180 degrees to extend in the same direction as said first end portion, said first set of openings including a first pair of aligned openings in said end wall and side wall edge, respectively and a second pair of openings in said end and side wall spaced inwardly from said first pair of openings, said first end portion comprising means for extending through said first pair of openings and said opposite end portion comprising means for extending in the same direction as said first end portion through said second pair of openings, said gripping means comprising a bent handle portion between said first and opposite end portions for gripping by an operator to urge said latch pin in the opposite direction to release said first and opposite end portions from one opening of said first and second pair, respectively.

11. A collapsible wire cage comprising:
an open-ended enclosure defined by opposed upper and lower walls, and opposed side walls, each of the upper and lower walls being collapsible and being pivotally connected at its opposite side edges to adjacent side edges of the side walls;
a pair of end walls for closing the opposite ends of the enclosure, each end wall being pivotally secured to one of the side walls at the respective end of the enclosure and having releaseable fastener means for releaseably securing it to the opposite side wall;
the collapsible walls each comprising at least two panel sections and pivot means for pivotally connecting said panel sections about a pivot axis extending between said opposite ends of said enclosure, said pivot means comprising means for allowing pivotal movement of said sections between an open position in which they are substantially flat and co-planar and a collapsed position in which they are folded inwardly relative to said enclosure into a face to face engagement to one another to allow said other pair of walls to be moved towards one another to collapse said cage;
each of said collapsible walls further including releasable securing means for releasably securing the respective collapsible wall in said open position; and
each of said walls having a handle member at its upper edge for carrying the cage when collapsed.

12. A collapsible wire cage comprising:
two pairs of opposed walls defining an open-ended enclosure, each wall of one pair being collapsible and being pivotally connected at its opposite side edges to adjacent side edges of the other pair of walls;
a pair of end walls for closing the opposite ends of the enclosure, each end wall being pivotally secured to one of the walls of said pair at the respective end of the enclosure and having releaseable fastener means for releaseably securing it to the opposite wall of said other pair;
the collapsible walls each comprising at least two panel sections and pivot means for pivotally connecting said panel sections about a pivot axis extending between said opposite ends of said enclosure, said pivot means comprising means for allowing pivotal movement of said sections between an open position in which they are substantially flat and co-planar and a collapsed position in which they are folded inwardly relative to said enclosure into a face to face engagement to one another to allow said other pair of walls to be moved towards one another to collapse said cage; and each of said collapsible wall further including releaseable securing means for releasably securing the respective collapsible wall in said open position, the releaseable securing means being offset and parallel to the pivot axis of said pivot means said securing means, comprising means for releasably securing said panel sections together.

* * * * *